June 30, 1964   H. E. BREY ETAL   3,138,965
CHANGE SPEED TRANSMISSION
Filed Aug. 31, 1961   4 Sheets-Sheet 2
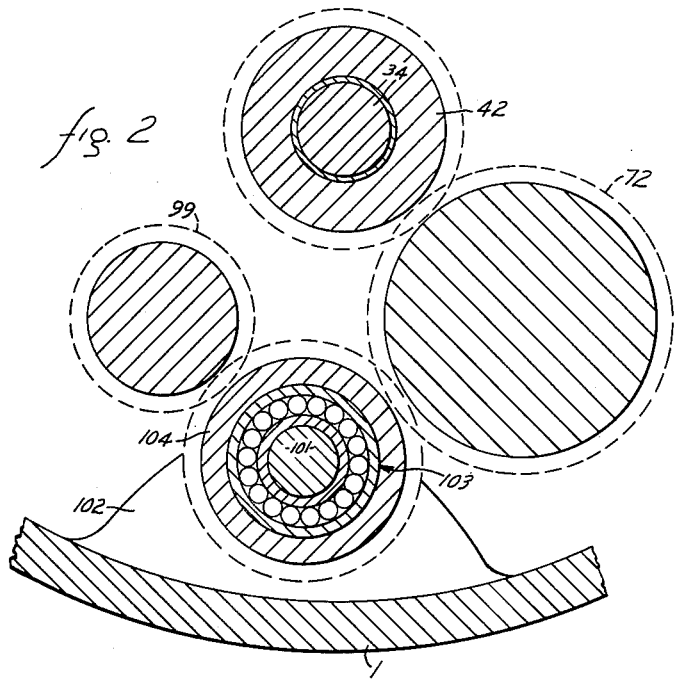
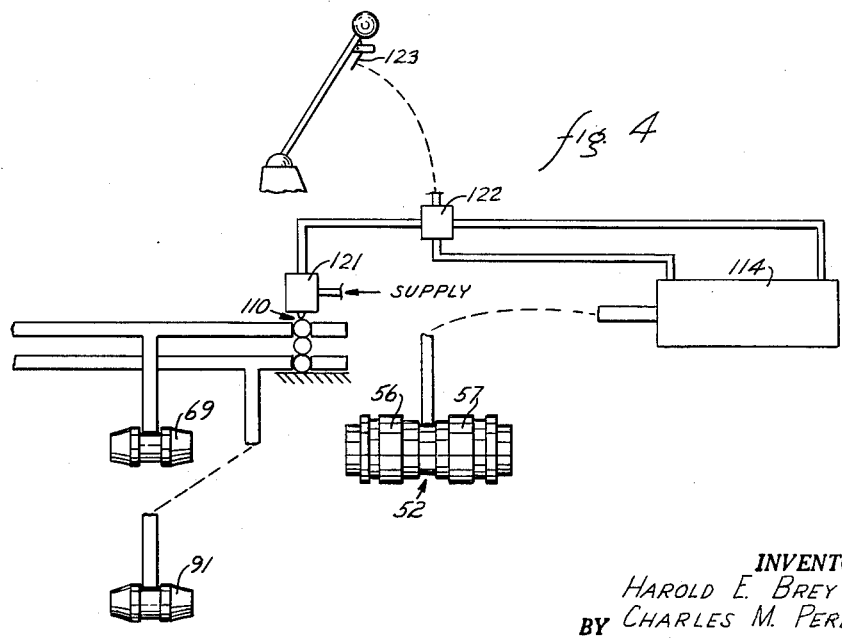
INVENTORS.
HAROLD E. BREY
BY CHARLES M. PERKINS
Woodhams, Blanchard and Flynn
ATTORNEYS

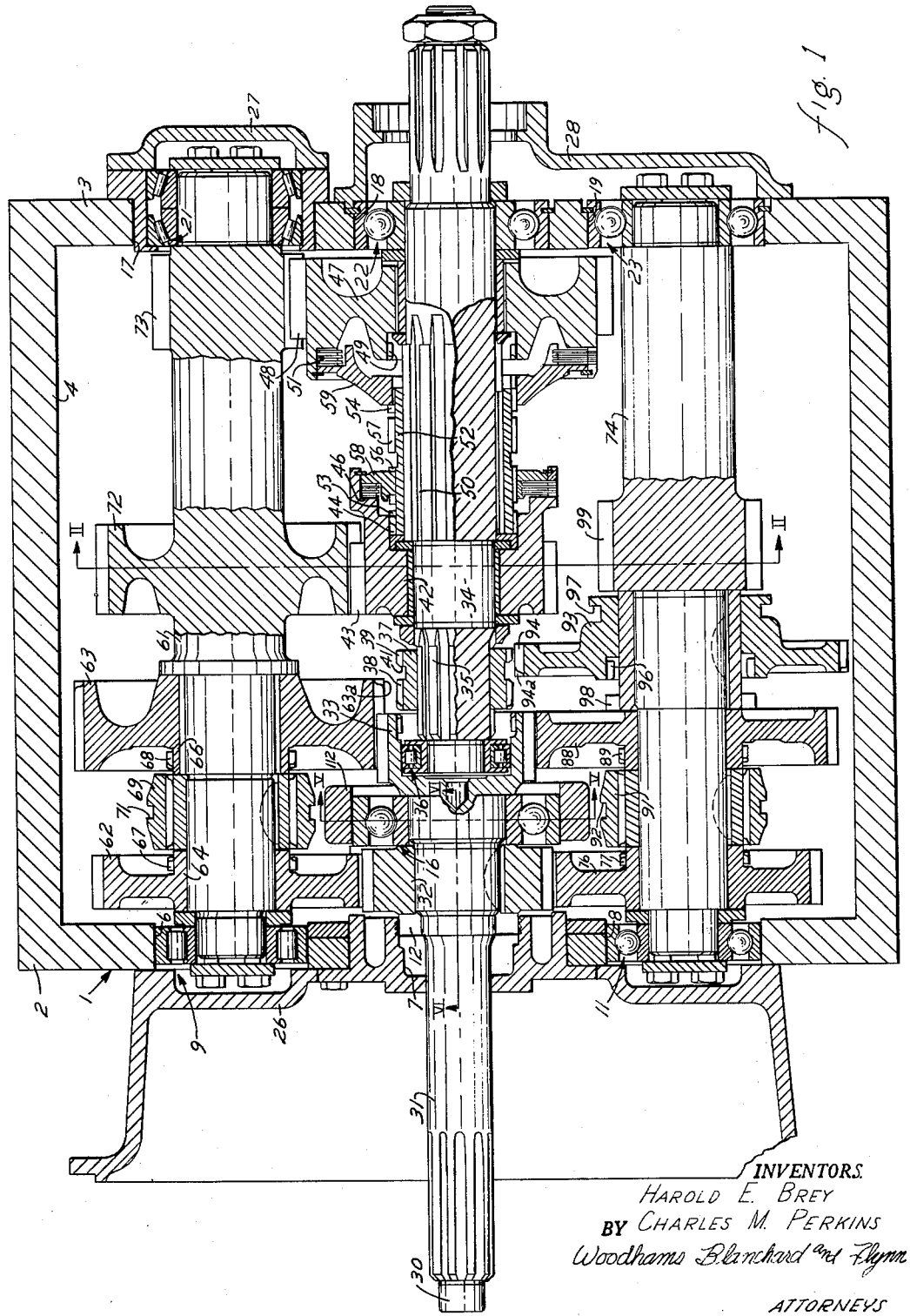

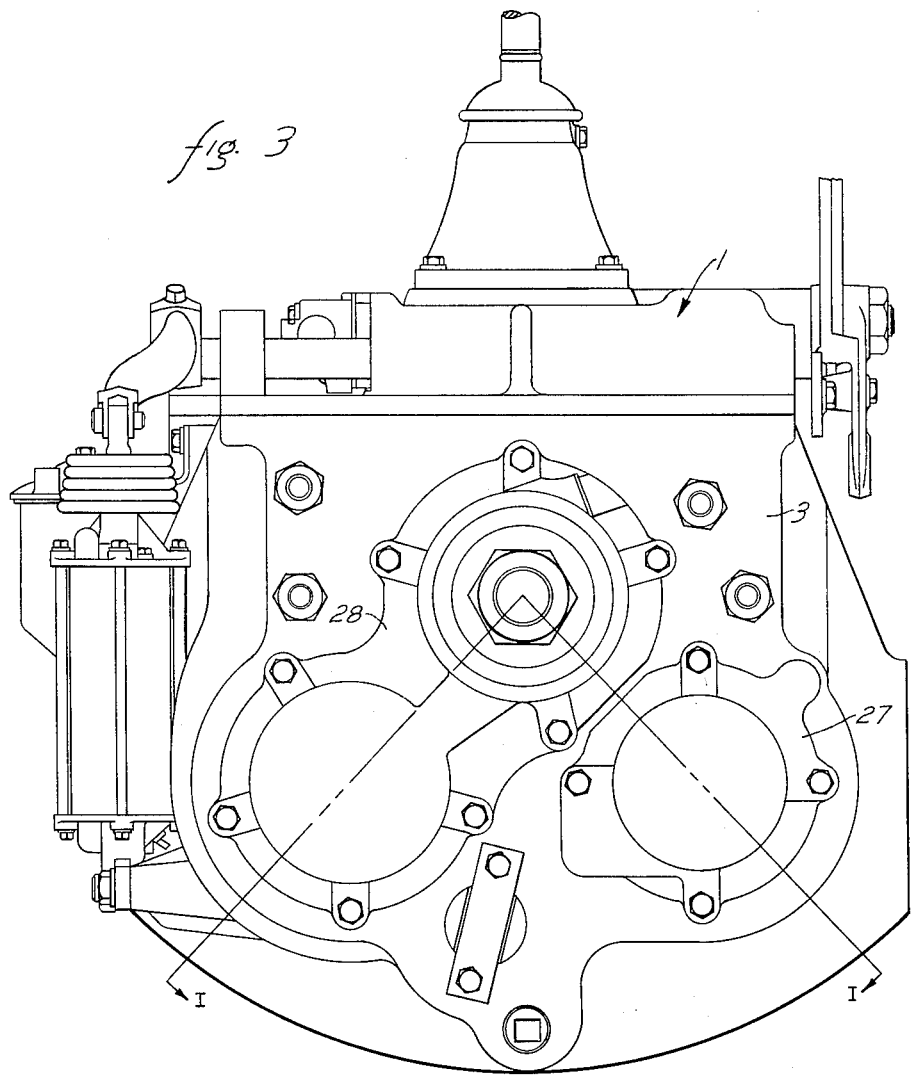

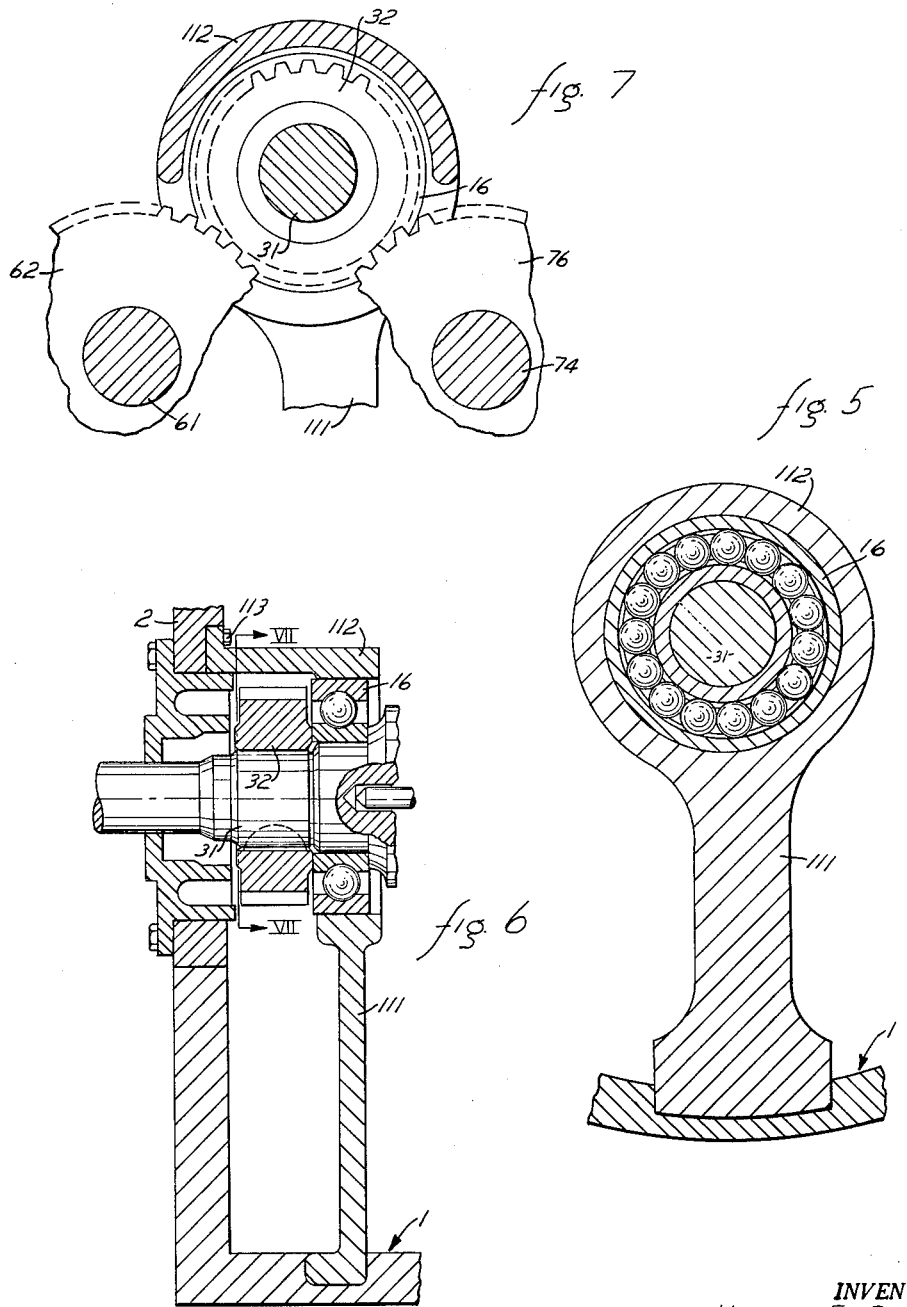

United States Patent Office 3,138,965
Patented June 30, 1964

3,138,965
CHANGE SPEED TRANSMISSION
Harold E. Brey, Tucson, Ariz., and Charles M. Perkins, Oshtemo, Mich., assignors to Eaton Manufacturing Company, Cleveland, Ohio, a corporation of Ohio
Filed Aug. 31, 1961, Ser. No. 135,284
16 Claims. (Cl. 74—331)

This invention relates to transmission devices and relates especially to automotive transmissions for heavy-duty use, such as that required for heavy trucks or for earth-moving equipment. The invention is particularly directed toward transmissions of the type mentioned having a large number of ratios but permitting only a relatively short axial length.

Inasmuch as the problem out of which the present invention arose occurred in the automotive-transmission industry, the embodiment here chosen to illustrate the invention is a transmission adapted for either automotive, earth-moving or other generally similar use. However, it will be recognized that such an embodiment is selected solely for illustrative purposes and the choice of such an embodiment is not limiting.

In the design of automotive, and similar, transmissions the axial length available is and long has been often a severely limiting condition. Thus, where a large number of ratios are involved, it is often desirable to use a transmission having a main shiftable gear group and a serially connected auxiliary shiftable gear group, such as that disclosed in the patent to Ludvigsen and Backus, No. 2,637,221. In said patent there is set forth a system for arranging main and auxiliary transmission gears wherein said main gears are provided with relatively closely spaced ratios and the auxiliary transmission is provided with a range shift having a range of ratios substantially equal to or slightly greater than the total range of ratios in the main transmission. However, in said Patent No. 2,637,221 this transmission system was set forth with an auxiliary transmission affixed to one end of a main transmission. This while effective mechanically results in a rather long structure so that where only a limited axial space is available the use of such a device may not be desirable. Nevertheless, the range shifting concept disclosed and claimed in said Patent No. 2,637,221 has proved highly effective in practice for shifting through a large number of gear ratios with a minimum of inconvenience to the operator, and with a minimum of skill required of the operator. This has been recognized by the designers of other previous devices which have embodied the principles of said United States Patent No. 2,637,221 and wherein a shorter axial length was sought. However, these have had various deficiencies in their operation which it is the purpose of the present invention to correct.

Therefore, the objects of the invention are:

(1) To provide a transmission having a large number of available ratios but being of relatively short axial length.

(2) To provide a device, as aforesaid, utilizing a main transmission having shiftable ratios therein together with a serially connected auxiliary transmisison which latter may be of either the range shifting or the splitter type.

(3) To provide a transmission, as aforesaid, wherein said auxiliary gear group is positioned laterally of the main gear group components even though from a functional point of view same are serially connected thereto.

(4) To provide a transmission device, as aforesaid, which can be manipulated by the operator in the same manner as presently known transmissions utilizing auxiliary gear groups so that insofar as the operator is concerned, the transmission of the present invention can be operated by the same technique as is already familiar for operating previously known transmissions, particularly, range shifting transmissions of the type shown in Patent No. 2,637,221.

(5) To provide apparatus, as aforesaid, having relatively short axial length requirements but capable of maintaining the advantages of closely spaced main transmission ratios and a widely spaced auxiliary transmission ratio as set forth in United States Patent to Ludvigsen and Backus, No. 2,637,221.

(6) To provide a shiftable transmission of the type, as aforesaid, which will accomplish the objects and purposes above set forth without requiring unreasonable complexity and without involving excessive costs.

(7) To provide a shiftable transmission of the type, as aforesaid, which will require no sensitive or delicately adjusted parts but which will instead be strong, sturdy and capable of long life with a minimum of maintenance.

Other objects and purposes of the invention will be apparent to persons acquainted with apparatus of this general type upon reading the following specification and inspection of the accompanying drawings.

In the drawings:

FIGURE 1 is a section of an automotive transmission embodying the invention and taken on the line I—I of FIGURE 3.

FIGURE 2 is a section taken on the line II—II of FIGURE 1.

FIGURE 3 is an end view taken from the rearward end of the transmission, the same being the rightward end of FIGURE 1.

FIGURE 4 is a schematic indication of one form of control means.

FIGURE 5 is a section taken on the line V—V of FIGURE 1.

FIGURE 6 is a section taken on the line VI—VI of FIGURE 1.

FIGURE 7 is a section taken on the line VII—VII of FIGURE 6.

*General Description*

In meeting the objects and purposes above set forth, we have first provided a plurality of ratio gearing relationships between the input shaft of the transmission and a pair of countershafts. One of said countershafts also includes auxiliary gearing corresponding in its ratio relationships to the auxiliary gearing of the usual serially arranged auxiliary transmission assembly. Said auxiliary gearing is driven either by the driven gearing of the countershaft on which said auxiliary gears are located or it is driven by the other countershaft, whereby said auxiliary gears are driven successively by each of said plurality of ratio gears and said auxiliary gears then drive the transmission output shaft.

*Detailed Description*

In the following description, reference will for illustrative purposes be made to an automotive-type transmission which may be applied either to over-the-highway, or off-the-highway use, a particular example of said latter use being in earth-moving equipment. While various specific designs may be utilized, the one hereinafter set forth will sufficiently illustrate the invention to enable others to practice same.

In describing the apparatus here chosen to illustrate the invention, certain terminology will be utilized for convenience in description, and it will be understood that it is used solely for convenience and with no limiting significance. For example, the terms "rightwardly" and "leftwardly" will refer to parts of the apparatus as appearing in the attached drawings. The terms "upwardly" and "downwardly" will also refer to directions appearing in the attached drawings. The terms "inwardly" and "outwardly" have reference to directions toward and away from the geometric center of the apparatus. All of such terminology will include derivatives of the words above specifically named, together with words of similar import.

Referring now to the drawings, there is provided a casing 1 having a forward wall 2, a rearward wall 3, and side walls 4. The front wall 2 has bearing openings 6, 7 and 8 provided therein, bearing assemblies 9 and 11 are arranged in bearing openings 6 and 8, respectively, and an oil seal 12 is arranged within the opening 7. Any suitable means may be provided for supporting the bearing 16 in position as shown. In the present embodiment, this is provided by an upstanding bearing bracket 111 supported at its lower end upon the bottom of the casing 1 and at its upper end by an integrally formed hood 112 which extends forwardly and is received into the forward wall 2 thereof, said hood being affixed to said forward wall by any convenient means, such as a plurality of screws of which one appears at 113.

The rearward wall 3 has openings 17, 18 and 19 therein coaxially aligned with the openings 6, 7 and 8. Said openings, respectively, receive and retain bearings 21, 22 and 23 therein. The bearings 9 and 11 and the oil seal retainer 12 are held in place in a conventional manner by the clutch housing 26 and the bearings 21, 22 and 23 are held in place by cap members 27 and 28, cap 27 covering bearing 21 and cap 28 covering and retaining in place bearings 22 and 23.

The constructional details thus far described will be recognized as substantially conventional and subject to a wide variation. They are set forth herein solely to insure a complete understanding of the invention and are not to be given any limiting significance.

Turning now to the gearing arrangement provided within the structure above described, there is provided an input shaft 31 supported in part by the bearing 16 and in part by the pilot 30 suitably received in a conventional manner in connecting means (not shown) such as a clutch. The oil seal 12 prevents the escape of oil along said shaft 31 through the forward wall 2. A gear 32 is affixed on and for rotation with the shaft 31 and is located closely adjacent the bearing 16. A further gear 33 is likewise affixed on and for rotation with the shaft 31 and is also positioned closely adjacent the bearing 16 but in this embodiment said gear 33 is on the opposite side of the bearing 16 from the gear 32. Also, in this embodiment, said gear 33 is formed by an enlargement of the rightward end of the shaft 31. The mainshaft 34 of the transmission has its leftward end supported within a bearing 36 in turn held within the rightward end of the shaft 31 and said mainshaft 34 has its rightward end supported by the bearing 22. The rightward end of the mainshaft 34 is fitted in a convenient manner for the delivery of power to the desired load. Immediately to the right of that portion of the mainshaft 34 which is received within the bearing 36, there is provided a splined section 35 supporting nonrotatably, but slidably, a slider 37 having jaw clutch teeth 38 and 39 at each end thereof and having a yoke-receiving annular groove 41 provided therein. A suitable yoke, not shown, is provided within said groove 41 in any conventional manner but illustration thereof is omitted from the drawings in order to avoid unnecessarily complicating the drawings.

Immediately to the right of the splined section 35 of the shaft 34 is arranged a gear 42 which is mounted rotatably with respect to said shaft 34. Said gear has external teeth 43 formed thereon as shown and internal clutch teeth 44 together with one side of a conventional synchronizer 46 of any convenient friction type. A generally similar but larger gear 47 is rotatably arranged on the shaft 34 adjacent the bearing 22 and includes external teeth 48 together with internal clutch teeth 49 and synchronizing means 51. A splined section 50 is arranged on the shaft 34 between said gears 42 and 47. A slider 52 is slidably but nonrotatably arranged on and in the splined section 50 and is externally provided with clutch teeth 53 and 54 and with blocker teeth 56 and 57. Said clutch and blocker teeth are of conventional form and their functioning will be recognized in the light of the description hereinafter following to be of substantially conventional type. Annular synchronizing elements 58 and 59 are provided having internal teeth for cooperation with the blocker teeth 56 and 57 and having synchronizer plates thereon cooperating with the synchronizer plates of synchronizing means 46 and 51 above mentioned. Thus, leftward positioning of the slider 52 as shown in the drawings will connect the gear 42 for rotation with the mainshaft 34 while rightward positioning of said slider 52 will connect the gear 47 for rotation with the mainshaft 34. Only one of the gears 42 and 47 is connected for rotation with the shaft 34 at a given time.

A first countershaft 61 is supported at its ends in and by the bearings 9 and 21. Said first countershaft 61 has a gear 62 arranged thereon for rotation with respect thereto and said gear has external teeth thereon which teeth are in constant mesh with the teeth of the gear 32. A further gear 63 is supported on and by the first countershaft 61 for rotation with respect thereto. Said gear 63 has external teeth thereon which are in constant mesh with the external teeth of the gear 33. Said gears 62 and 63 also have hubs 64 and 66 provided thereon which hubs are provided with external jaw clutch teeth 67 and 68, respectively. A slider 69 is provided between the gears 62 and 63, said slider being nonrotatably arranged with respect to the first countershaft 61 but having internal jaw clutch teeth thereon which are capable of meshing with the teeth 67 and 68. Thus, a leftward position of the slider 69 connects the gear 62 for rotation with the shaft 61, with the gear 63 being disengaged and the rightward position of the slider 69 will connect the gear 63 for rotation with the shaft 61 and the gear 62 is then disengaged. The slider 69 has an annular groove 71 therein for engagement in any convenient manner to effect the desired sliding movement thereof, which engagement may be by an ordinary yoke device not shown.

To the right of the gear 63 there is provided a first auxiliary gear 72 rotatable with said shaft 61, hereby being made integral therewith, and said gear 72 has external teeth thereon which are in constant mesh with the teeth 43 of the mainshaft gear 42.

Near the rightward end of the first countershaft 61 there is a further gear 73 which is rotatable with the shaft 61, hereby being formed integrally therewith which gear has external teeth thereon, which teeth are in constant mesh with the teeth 48 of the gear 47.

A second countershaft 74 is rotatably supported in and by the bearings 11 and 23 and is arranged parallel to both of the input shaft 31 and the mainshaft 34 as well as parallel to the first countershaft 61. Said second countershaft 74 carries thereon a gear 76 which is in this embodiment identical with the gear 62, the same being rotatable with respect to the shaft 74, has external teeth thereon in constant mesh with the teeth of the gear 32 on the input shaft 31 and has jaw clutch teeth 77 thereon for the purpose appearing hereinafter. Spaced rightwardly from said gear 76 is a further gear 88 which in this embodiment is of the same diameter and has the same number of teeth as the gear 63 and said teeth are in constant mesh with the external teeth of the gear 33. Said gear 88 also has jaw clutch teeth 89 for purposes appearing hereinafter. As the description progresses, it will be recognized that while the gears 62 and 76 are of the same size and number of teeth with respect to each other and the gears 63 and 88 are of the same size and number of teeth with respect to each other this relationship is only a convenient relationship for the kind of transmission being here utilized as an illustrative embodiment. For meeting various specific or special ratio requirements within a given transmission, the relationship of these pairs of gears to each other may be varied freely with said gears being of different sizes with respect to each other as desired.

Positioned between the gears 76 and 88 is a slider 91 which is arranged nonrotatably with respect to the shaft 74 but which will slide axially with respect thereto. Said slider has internal teeth therein for meshing with the jaw clutch teeth 77 and 89 whereby said gears 76 and 88 are one at a time as desired connected to the shaft 74 for rotation therewith. Said slider is provided with an annular groove 92 for reception of means effecting the axial movement thereof, such as a common shift yoke not shown.

Next rightwardly of the gear 88 is a reverse gear 93 which in the position shown in the drawing is rotatably supported on and by the shaft 74, has external teeth 94 thereon and internal clutch teeth 96. Said gear 93 is provided with means effecting axial movement thereof, such as an annular groove 97 into which may be received an ordinary shift yoke, not shown. External jaw clutch teeth 98 are provided on the shaft 74 for interengagement with the teeth 96 upon leftward movement of the reverse gear 93. Said reverse gear 93 is meshable with the gear 63, the teeth 94 of the gear 93 being bevelled at 94a to interengage readily through the bevelling 63a with the teeth of the gear 63. The interengagement of the gear 93 with the gear 63 occurs prior to the engagement of said gear 93 with the jaw clutch teeth 98. (In examining these gears as shown in FIGURE 1 it will be borne in mind that FIGURE 1 is a representation in a single plane of two planes which are at an acute angle with respect to each other as shown in FIGURE 3 which makes it possible for the gear 93 to engage the gear 63.)

Next rightwardly from the gear 93 is a gear 99 arranged for rotation with the shaft 74, here by being formed integrally therewith.

Referring now to FIGURE 2, there is shown a fixed rod 101 arranged rigidly between an upstanding boss 102 and the rear casing wall 3 (FIGURE 1). A bearing 103 is supported of said rod 101 and a gear 104 is arranged on said bearing rotatably with respect to the rod 101. Said gear 104 is provided with external teeth which are in constant mesh with both of the gear 72 and the gear 99 (FIGURE 2).

The ratios of said gears are capable of a wide choice. Primarily, the invention contemplates that the "main" ratios (those including gears 62, 63, 76 and 88) shall be closely and rather equally spaced to total about half the total range of the transmission, while the "auxiliary" ratios (those involving gears 72 and 73) will cover a range slightly greater than some chosen portion, usually all, the range of the main ratios in the same manner as set out in Patent No. 2,637,221. However, the invention is equally useful for a system where the main ratios cover the entire range of the transmission and the auxiliary functions as a splitter.

By way of example, the following is set forth as typical ratios utilized with the hereinafter described apparatus.

Ratios:
| | |
|---|---|
| 9th | 1.00 ⎫ |
| 8th | 1.21 ⎪ |
| 7th | 1.59 ⎬ High range. |
| 6th | 2.07 ⎪ |
| 5th | 2.72 ⎭ |
| 4th | 3.79 ⎫ |
| 3rd | 4.98 ⎪ |
| 2nd | 6.50 ⎬ Low range. |
| 1st | 8.54 ⎭ |
| Reverse | 2.93 high. |
| Reverse | 9.22 low. |

Operation

In a typical operation of the apparatus, the input shaft 31 may be taken as the power input ends of the apparatus and the rightward end of the mainshaft 34 may be taken as the power output point of the apparatus.

Assuming now that the apparatus as shown and described is fitted with suitable shift mechanisms which will normally involve manual or power driven shift rods and shift yokes, none of which is shown in FIGURES 1 and 2 for the purpose of simplifying the drawings but which may be of any known and convenient type, reference will be made solely to actual shifting of the several shift elements.

As shown in the drawing, the apparatus is in neutral position whereby rotation of the power inputs shaft 31 will not effect rotation of the mainshaft 34.

Neutral to First Gear

To shift the apparatus into first gear, the slider 91 on the second countershaft 74 is moved rightwardly to lock the gear 88 to said second countershaft. This will effect a driving connection from the power input shaft 31 through the gears 33 and 88 to the second countershaft 74 hence through the gears 99 and 104 to the gear 72 on the first countershaft 61. Thus, the range shift or auxiliary section of the unit is subjected to low ratio driving. To apply said low ratio at a low range ratio to the output shaft, the slider 52 is moved rightwardly. Since the vehicle presumably is at a standstill, the shaft 34 will not be rotating and hence no synchronizer action will be involved. However, upon rotative movement of the gear 47 in response to the rotation of the gear 73, the jaw clutch teeth 54 and 49 will be permitted to engage and rightward movement of the sleeve 52 will be completed. Thus, the apparatus is in low-speed, low-range position.

First Gear to Second Gear

Second gear is obtained merely by moving the slider 91 from its rightward to its leftward position so that the second countershaft 74 is now driven through the gears 32 and 76. The driving train through the gears 99, 104, 72, 73 and 47 to the mainshaft 34 will remain unchanged.

Second Gear to Third Gear

The third gear ratio is provided by moving the slider 91 back to its neutral position and moving the slider 69 to its rightward position for driving the first countershaft 61 through the gear 63 from the gear 33. The second countershaft is not involved in this ratio. Thus, the driving train from the input shaft 31 will be to the gear 33 and the gear 63 to the first countershaft 61, thence through the gears 73 and 47 to the output shaft 34.

Third Gear to Fourth Gear

Fourth speed low-range position is accomplished by moving the slider 69 leftwardly to release the gear 63 and engage the gear 62 rotatably with the first countershaft 61. Thus, the driving train will be from the input shaft 31 through the gears 32 and 62 to the first countershaft 61 and thence as before through the gears 73 and 47 to the output shaft 34.

Fourth Gear to Fifth Gear

The fifth speed position is obtained by returning the gears in the forward portion of the assembly to the low speed position as above described and shifting the slider 52 leftwardly to connect through the gear 42 to the output shaft 34 and to disconnect the connection from the gear 73 through the gear 47 to the output shaft 34.

This is carried out functionally in the same manner as set forth in the patent to Ludvigsen and Backus, No. 2,637,221, which will, however, for convenient reference herein be briefly summarized hereinafter.

As the slider 69 comes into its neutral position, and with slider 91 already in neutral position, it acts through a conventional interlock mechanism schematically indicated at 110 and opens the valve 121. The directional valve 122 having already been opened in the proper direction by suitable presetting from the control 123 on the shift lever, the auxiliary shift cylinder 114 is energized and the slider 52 is urged leftwardly. As the synchronizers 46 engage, and with the forward part of the assembly in neutral position, such synchronizers have only the inertia of the two countershafts 61 and 74 and gears 104, 42 and 47 to overcome and this can be accomplished very quickly. Thus, the synchronization is effected by the synchronizer 46 and the slider 52 continues to move leftwardly and connects the gear 42 to the output shaft 34. The slider 91 may then be moved rightwardly to engage the gear 88 with the second countershaft 74 and the forward part of the system is returned to its low ratio position and the entire transmission is in fifth speed.

Fifth Gear to Sixth Gear

Sixth gear is accomplished in the same manner as the shift from first to second gear, namely, by moving the slider 91 from its rightward position to its leftward position whereby the gear 88 is disconnected from the second countershaft 74 and the gear 76 is connected thereto.

Sixth Gear to Seventh Gear

Seventh gear is accomplished in the same manner as third gear, namely, by returning the slider 91 to neutral position and moving the slider 69 rightwardly to connect the gear 33 through the gear 63 to the first countershaft 61 which is then connected through the gears 72 and 42 to the output shaft 34.

Seventh Gear to Eighth Gear

Eighth gear is accomplished in the same manner as fourth gear, namely, by moving the slider 69 into its leftward position whereby to release the gear 63 and to connect the gear 62 to the countershaft 61. Thus, the power train is from the input shaft 31 through the gear 32 thence through the gear 62, countershaft 61, the gear 72 and the gear 42 to the output shaft 34.

Eighth Gear to Ninth Gear

Ninth gear is obtained by returning both of the sliders 91 and 69 to their neutral position and moving the slider 37 leftwardly to engage the internal jaw clutch teeth of the gear 33 with the teeth 38 of the slider 37 and thereby establish a direct connection from the input shaft 31 to the output shaft 34.

Downshift Sequence

The downshift sequence is the reverse of the upshift sequence as above described and needs no detailed explanation excepting for a few words with respect to the shift from fifth to fourth position inasmuch as this again involves a range shift from the gear 42 to the gear 47.

In this shift the preselect means 123 is actuated to reverse the valve 122 so that when the sliders 69 and 91 are again both returned to neutral position, the slider 52 is urged rightwardly. The synchronizers 51 act to synchronize the gear 47 with the shaft 34.

It will be noted that in both the upshift and downshift, at the range shift point, the sliders 69 and 91 are disengaged so that the synchronizers have only to change the speed of the countershafts, gears carried fixedly thereon and gears 104, 42 and 47. It should be particularly noted that this includes only the gears which are fixed with said countershafts and in the range shift operation such speed change does not include the gears 62, 63, 76, 88 or 93 inasmuch as none of these gears are clutched to their respective countershafts at the time of a range shift. Thus, the inertia effects which the synchronizers are required to overcome are relatively small and the synchronizing incident to shifting of the slider 52 in either direction can be completed very quickly.

Upon completion of rightward movement of the slider 52, the slider 69 may then be moved leftwardly to arrange the parts in fourth gear position and the shift into fourth gear is completed.

Also as set forth more fully in Patent No. 2,637,221, to which reference is invited for complete explanation of the ratio relationships between the several gears involved, it will be understood that where, as above set forth, the ratios involving gears 62, 63, 76 and 88 are relatively closely spaced and involve substantially equal steps (the total range expected from the shifting of these gears being only one half of the total range of the transmission) the shifting of these gears is relatively easy and may be accomplished without the necessity of synchronizers in this portion of the apparatus.

Reverse

To effect a reverse drive, the apparatus is, of course, at a standstill so that the output shaft 34 is not moving. The reverse gear 93 is urged leftwardly by a suitable manual control, not shown, as the clutch is released.

The gear 93 is urged leftwardly by a suitable manual control, not shown, to engage the gear 63 on the first countershaft 61, and the internal clutch teeth 96 with the external jaw clutch teeth 98 on the second countershaft 74. This will effect a driving connection from the power input shaft 31 through the parts 33, 63, 93, 96 and 98 to the second countershaft 74, thence through gears 99, 104 and 72 to the first countershaft 61. By proper positioning of slider 52 to engage gears 72 and 42, or gears 73 and 47, said reverse driving may be made at either of two ratios when the clutch is released.

It will be noted that by this reverse arrangement the reverse is out of mesh during a range shift which helps to minimize the inertia effects which need to be overcome by the synchronizers 46 and 51 in accomplishing a range shift.

Although particular preferred embodiments of the invention have been disclosed in detail above for illustrative purposes, it will be understood that variations or modifications of such disclosures, which lie within the scope of the appended claims are fully contemplated.

What is claimed is:

1. Mechanical ratio shifting apparatus comprising in combination:
   an input shaft;
   an output shaft;
   first and second countershafts;
   clutching and ratio changing driving means between said input shaft and said first countershaft for selectively driving said first countershaft from said input shaft and independently of said second countershaft and other clutching and ratio changing driving means between said input shaft and said second countershaft for selectively driving said second countershaft from said input shaft and independently of said first countershaft;
   means continuously connecting said first countershaft and said second countershaft for rotation in the same rotational direction;
   means for driving said output shaft from said first countershaft at a selected one of two ratios.

2. Mechanical ratio shifting apparatus comprising in combination:
   an input shaft;
   an output shaft;
   first and second countershafts;
   clutching and ratio changing means between said input shaft and said first countershaft for selectively driving said first countershaft directly from said input shaft and other clutching and ratio changing driving means between said input shaft and said second countershaft for selectively driving said second countershaft directly from said input shaft, said ratio changing means providing relatively closely spaced ratios;

means for continuously connecting said first countershaft and said second countershaft for rotation in the same rotational direction;

range shifting means for driving said output shaft from said first countershaft at one of two relatively widely spaced ratios.

3. The apparatus defined in claim 1 wherein the said shafts are all parallel with respect to each other.

4. The apparatus defined in claim 2 wherein the difference between the range shifting ratios between said first countershaft and said output shaft is greater than the difference between ratios in a selected portion of the said relatively closely spaced ratios.

5. Mechanical ratio changing apparatus comprising in combination:
an input shaft;
an output shaft coaxially arranged with respect thereto;
a first countershaft parallel with said input and said output shafts and offset in one direction therefrom and a second countershaft parallel with said input shaft and said output shaft and offset in another direction therefrom;
a first group of change speed gearing for connecting said input shaft directly to said first countershaft so that said first countershaft may be driven in one rotational direction by said input shaft;
a second group of change speed gearing for connecting said input shaft directly to said second countershaft so that said second countershaft may be driven in said one rotational direction by said input shaft;
means for alternatively operating said first and second groups of change speed gearing;
constantly meshed means connecting said first and second countershafts for causing said countershafts to rotate in said one direction when either of them is rotated in said one direction by said input shaft;
means for driving said output shaft at a selected speed ratio with respect to said first countershaft.

6. The apparatus defined in claim 5 wherein said means for driving said output shaft includes a pair of ratio driving means between said first countershaft and said output shaft and manually operable means permitting the selection of one thereof for connection between said first countershaft and said output shaft.

7. Mechanical speed shifting apparatus comprising in combination:
an input shaft;
a pair of gears arranged thereon for constant rotation therewith;
an output shaft coaxially arranged with said input shaft;
a pair of countershafts arranged respectively laterally of the common centerline of said input and said output shafts;
a pair of main gears on each of said countershafts and rotatable therewith, said pairs of main gears being arranged oppositely with respect to each other, one main gear on each of said countershafts being in constant mesh with one of said input shaft gears and the other main gear on each of said countershafts being in constant mesh with the other gear on said input shaft;
means connecting one of said countershaft gears at a time to one of said countershafts to establish a selected main ratio;
constantly meshed means continuously connecting said countershafts for simultaneously rotating said first countershaft and said second countershaft in the same direction when either of said countershafts is driven by said input shaft;
means between said first countershaft and said output shaft establishing a selected auxiliary ratio drive relationship between said first countershaft and said output shaft and further manually controllable means selecting said auxiliary ratio independently of the selection of the main ratios.

8. A change speed transmission, comprising:
an input shaft;
an output shaft;
first and second countershafts;
ratio drive means for selectively and alternatively driving said countershafts in the same rotational direction directly from said input shaft;
ratio drive means for driving said output shaft from said countershafts;
a gear train including a first gear fixed with respect to said first countershaft, an intermediate, freely rotatable gear and a third gear fixed with respect to said second countershaft for effecting simultaneous rotation of said first and second countershafts in the same rotational direction.

9. A change speed transmission, comprising:
an input shaft;
an output shaft;
first and second countershafts;
ratio drive means for selectively and alternatively driving said countershafts in the same rotational direction directly from said input shaft;
ratio drive means for driving said output shaft from said countershafts;
constantly engaged means continuously connecting said first and second countershafts for effecting simultaneous rotation thereof in the same rotational direction.

10. A change speed transmission according to claim 9, in which the ratio drive means for driving the countershafts comprises a plurality of gears on the input shaft;
a plurality of gears mounted on each of the countershafts for rotation with respect thereto, the input shaft gears being continuously meshed with gears on the countershafts; and
means for selectively and alternately clutching the countershaft gears to their associated countershafts.

11. A change speed transmission, comprising:
an input shaft having a pair of gears mounted thereon for rotation therewith;
an output shaft coaxial with and adjacent to said input shaft;
first and second countershafts parallel with and laterally offset from said input and output shafts;
a pair of gears mounted on each countershaft for rotation with respect thereto, corresponding gears on said countershafts being continuously meshed with the respective gears on said input shaft;
means for selectively and alternately clutching each of said countershaft gears to its associated countershaft;
third and fourth gears mounted on said first countershaft for rotation therewith;
a pair of gears rotatably mounted on said output shaft and being continuously meshed, respectively, with said third and fourth gears on said first countershaft;
means for selectively and alternately clutching said output shaft gears to said output shaft;
a further gear fixedly mounted on said second countershaft for rotation therewith and in substantial lateral alignment with said third gear on said first countershaft; and
a freely rotatable gear positioned between and meshed with said third gear and said further gear.

12. A change speed transmission according to claim 11, in which said freely rotatable gear is supported for rotation about an axis laterally offset from and parallel with the common axis of said input and output shaft and between the axes of said countershafts.

13. A change speed transmission, comprising:
an input shaft;
an output shaft;
first and second countershafts;
ratio drive means for selectively and alternatively driving said countershafts in the same rotational direction directly from said input shaft;

ratio drive means for driving said output shaft from said first countershaft, said output shaft being free from connection to said second countershaft except through said first countershaft;

constantly engaged means continuously connecting said first and second countershafts for effecting simultaneous rotation thereof in the same rotational direction whereby said output shaft can be driven when either said first or said second countershaft is driven from said input shaft.

14. A change speed transmission, comprising:
an input shaft having a plurality of gears thereon;
an output shaft;
a pair of countershafts parallel with said input and output shafts, each countershaft having a plurality of gears thereon which are meshed with the gears on said input shaft, the gears on said input shaft and said countershafts providing a plurality of alternately selectable, closely spaced ratios;
range-shifting gears on said countershafts and said output shaft for selectively and alternately driving said output shaft at a plurality of speed ratios with respect to said countershafts, said last-named speed ratios being spaced apart an amount greater than the spacing of at least a major portion of the ratios provided by the gears on said input shaft and said countershafts;
clutch means for establishing the speed ratio at which said output shaft is driven; and
friction clutch synchronizing means associated with said clutch means and said range-shifting gears for effecting synchronization thereof during a shifting of the range ratio, control means connected to said clutch means for effecting operation thereof, said control means including means responsive to the position of said clutch means for shifting the range ratio when said countershafts are out of driving relationship with said input shaft.

15. A change speed transmission, comprising:
an input shaft;
an output shaft;
first and second countershafts;
first clutching and ratio changing driving means between said input shaft and said first countershaft for selectively driving said first countershaft from said input shaft independently of said second countershaft and second clutching and ratio changing driving means between said input shaft and said second countershaft for selectively driving said second countershaft from said input shaft independently of said first countershaft, said first and second clutching and ratio changing driving means being alternatively actuable whereby either said first countershaft or said second countershaft can be driven from said input shaft;
a gear train including a first gear fixed to said first countershaft, an intermediate continuously freely rotatable gear and a third gear fixed with respect to said second countershaft for effecting simultaneous rotation of said first and second countershafts in the same rotational direction whenever one of said countershafts is driven from said input shaft; and
means for driving said output shaft from said countershafts at a selected one of two ratios.

16. A change speed transmission, comprising:
an input shaft;
an output shaft;
first and second countershafts;
first clutching and ratio changing driving means between said input shaft and said first countershaft for selectively driving said first countershaft from said input shaft independently of said second countershaft and second clutching and ratio changing driving means between said input shaft and said second countershaft for selectively driving said second countershaft from said input shaft independently of said first countershaft, said first and second clutching and ratio changing driving means being alternatively actuable whereby either said first countershaft or said second countershaft can be driven from said input shaft;
constantly engaged means continuously connecting said first and second countershafts for effecting simultaneous rotation thereof in the same rotational direction whenever one of said countershafts is driven from said input shaft; and
means for driving said output shaft from said countershafts at a selected one of two ratios.

References Cited in the file of this patent
UNITED STATES PATENTS

| | | |
|---|---|---|
| 2,316,503 | Curtis | Apr. 13, 1943 |
| 2,637,221 | Backus et al. | May 5, 1953 |
| 2,788,874 | Forster | Apr. 16, 1957 |
| 2,972,899 | Wiggermann | Feb. 28, 1961 |
| 3,064,488 | Lee et al. | Nov. 20, 1962 |
| 3,073,423 | Lee et al. | Jan. 15, 1963 |
| 3,080,767 | Price | Mar. 12, 1963 |